United States Patent
Adams et al.

(10) Patent No.: US 9,113,286 B1
(45) Date of Patent: Aug. 18, 2015

(54) CENTRALIZED CONTROL AND MANAGEMENT SYSTEMS FOR DIGITAL DEVICES

(71) Applicant: Asurion, LLC, Nashville, TN (US)

(72) Inventors: Cory Adams, San Antonio, TX (US); Michael Ballou, Irvine, CA (US); Nilesh Patel, Fremont, CA (US); Bhavesh Patel, Fremont, CA (US); Joel Tomassini, Nashville, TN (US); Casey Rosini, Mt. Juliet, TN (US); Merav Oren, Givataim (IL); Omri Haim, Tel-Aviv (IL); Tomer Dvir, Tel-Aviv (IL)

(73) Assignee: Asurion, LLC, Nashville, TN (US)

( * ) Notice: Subject to any disclaimer, the term of this patent is extended or adjusted under 35 U.S.C. 154(b) by 0 days.

(21) Appl. No.: 14/523,803

(22) Filed: Oct. 24, 2014

(51) Int. Cl.
*H04W 8/00* (2009.01)
*H04W 48/16* (2009.01)
*H04W 24/08* (2009.01)
*G06Q 30/06* (2012.01)

(52) U.S. Cl.
CPC ........... *H04W 8/005* (2013.01); *G06Q 30/0623* (2013.01); *H04W 24/08* (2013.01); *H04W 48/16* (2013.01)

(58) Field of Classification Search
CPC ..... H04W 8/005; H04W 48/16; H04W 24/08; G06Q 30/0623
USPC ......................................... 370/338, 328, 254
See application file for complete search history.

(56) References Cited

U.S. PATENT DOCUMENTS

| | | | |
|---|---|---|---|
| 7,716,077 B1 * | 5/2010 | Mikurak | 705/7.12 |
| 2006/0142034 A1 * | 6/2006 | Wentink et al. | 455/515 |
| 2007/0208837 A1 * | 9/2007 | Tian et al. | 709/223 |
| 2013/0332303 A1 * | 12/2013 | Schank et al. | 705/26.4 |

OTHER PUBLICATIONS

"Fing—Network Tools," Web page <https://play.google.com/store/apps/details?id=com.overlook.android.fing>, 3 pages, Jul. 1, 2014, retrieved from Internet Archive Wayback Machine <https://web.archive.org/web/20140701012640/https://play.google.com/store/apps/details?id=com.overlook.android.fing> on Mar. 17, 2015.

(Continued)

*Primary Examiner* — Mohammad Anwar
(74) *Attorney, Agent, or Firm* — Fish & Richardson P.C.

(57) ABSTRACT

Technologies for network and device management are disclosed. A described technique includes mapping a local network associated with a user to create a network map of one or more discovered devices that are communicatively coupled with the local network; determining device information about the one or more discovered devices, the device information including one or more device identifications corresponding to the one or more discovered devices; storing the network map and the device information in a profile associated with the user; and providing a centralized management interface for managing the one or more discovered devices. The interface can be configured to present information including the network map, the device information, and one or more notifications. The one or more notifications can be based on an analysis of the device information and the network map.

20 Claims, 8 Drawing Sheets

(56) References Cited

OTHER PUBLICATIONS

"UpdateLogic® NetReady™," Web page <http://updatelogic.com/NetReady.html>, 2 pages, May 15, 2014, retrieved from Internet Archive Wayback Machine <https://web.archive.org/web/20140515043150/http:/updatelogic.com/NetReady.html> on Mar. 17, 2015.

"UpdateLogic® SupportView™," Web page <http://www.updatelogic.com/SupportView.html>, 2 pages, Sep. 3, 2014, retrieved from Internet Archive Wayback Machine <https://web.archive.org/web/20140903114750/http:/www.updatelogic.com/SupportView.html> on Mar. 17, 2015.

"Revolv: The Universal Smart Home Hub & App," Web page <http://revolv.com/>, 6 pages, Jun. 27, 2014, retrieved from the Internet Archive Wayback Machine <https://web.archive.org/web/20140627142556/http:/revolv.com/> on Mar. 17, 2015.

"Wallyhome," Web page <https://www.wallyhome.com/>, 7 pages, Sep. 15, 2014, retrieved from the Internet Archive Wayback Machine <https://web.archive.org/web/20140915141517/https://www.wallyhome.com/how/> on Mar. 17, 2015.

\* cited by examiner

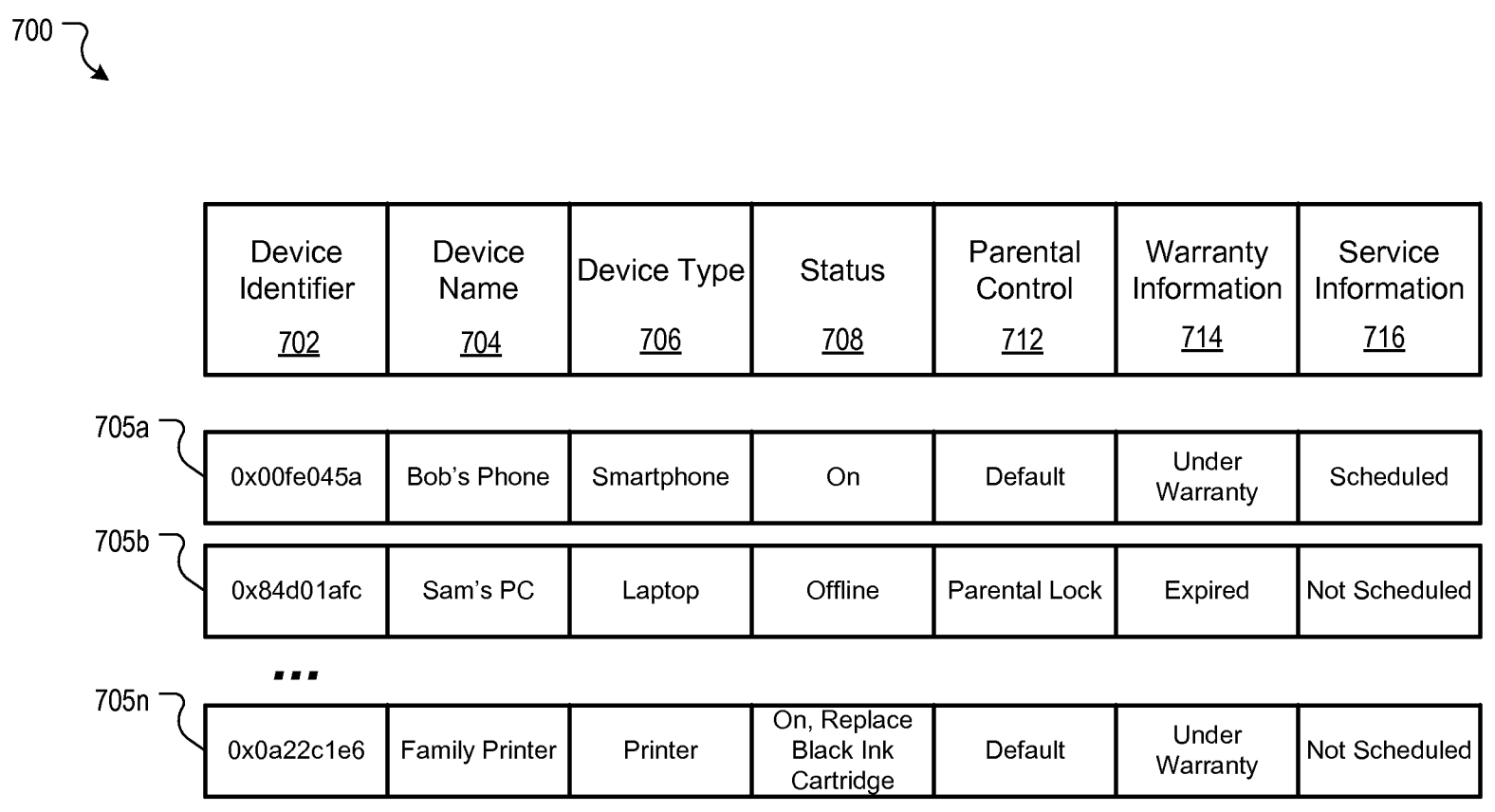

| Device Identifier 702 | Device Name 704 | Device Type 706 | Status 708 | Parental Control 712 | Warranty Information 714 | Service Information 716 |
|---|---|---|---|---|---|---|
| 0x00fe045a | Bob's Phone | Smartphone | On | Default | Under Warranty | Scheduled |
| 0x84d01afc | Sam's PC | Laptop | Offline | Parental Lock | Expired | Not Scheduled |
| ... | | | | | | |
| 0x0a222c1e6 | Family Printer | Printer | On, Replace Black Ink Cartridge | Default | Under Warranty | Not Scheduled |

FIG. 7

CENTRALIZED CONTROL AND MANAGEMENT SYSTEMS FOR DIGITAL DEVICES

FIELD

This patent document generally relates to device discovery in networks.

BACKGROUND

Digital devices can communicate over one or more networks. Devices can be connected to a local network, such as a home network, which is connected to a broader network such as the Internet. Once connected to a network, either through wireless or wireline connections, a device can use one or more protocols to publish a service provided by the device or a device can use one or more protocols to discover a service provided by another device. Various examples of protocols for device and/or service discovery include Universal Plug and Play (UPnP), Digital Living Network Alliance (DLNA), Bonjour, Home Network Administration Protocol (HNAP), Web Services Dynamic Discovery (WS-Discovery), Address Resolution Protocol (ARP), and Domain Name System (DNS) based protocols such as DNS-Based Service Discovery (DNS-SD) or multicast DNS (mDNS).

Some devices, for example, can use an mDNS service to publish and discover services, e.g., printing, media, file sharing, on the same local multicast network. For example, a printer can publish its printing service via mDNS using a multicast data packet. Other devices receiving the multicast data packet can discover the printing service and make the printing service available to local applications such as a word processor. In another example, a media hub can publish its media service via mDNS. Other devices can discover the media service and start receiving content from the media hub. Further, wireless devices such as cellphones, smartphones, or tablets can include an mDNS service process to publish or discover services on the same local wireless multicast network.

SUMMARY

This document describes, among other things, technologies relating to network and device management. In one aspect, a described technique includes mapping a local network associated with a user to create a network map of one or more discovered devices that are communicatively coupled with the local network; determining device information about the one or more discovered devices, the device information including one or more device identifications corresponding to the one or more discovered devices; storing the network map and the device information in a profile associated with the user; and providing a centralized management interface for managing the one or more discovered devices. The interface can be configured to present information including the network map, the device information, and one or more notifications. The one or more notifications can be based on an analysis of the device information and the network map.

This and other implementations may include one or more of the following features. Implementations can include determining a device identifier for a discovered device of the one or more discovered devices. Determining device information can include retrieving device data from a server based on the device identifier. Device data can include information that is selected from a group including product catalog device data, device warranty data, device backup data, and device pricing information. Implementations can include providing to a device associated with the local network, a management application. The management application can be configured to map the local network by at least scanning for devices using one or more wireless communication protocols via one or more wireless network interfaces and render the centralized management interface. Mapping the local network can include receiving data about the local network from the management application. Providing the centralized management interface can include sending the device information to the management application, and sending the one or more notifications to the management application. Determining device information can include operating a device in a monitoring mode to gather network traffic from the local network; and extracting data from the network traffic, where the device information can include one or more device types that are determined based on the extracted data. Providing the centralized management interface can include one or more of the following providing an interface to display warranty information about the one or more discovered devices, providing an interface to display resale pricing information about the one or more discovered devices, providing an interface to facilitate access to a service resource for repairing or providing advice related to at least one of the one or more discovered devices, or providing an interface to secure digital information across multiple different devices, platforms, or cloud services associated with the local network. Implementations can include receiving via the centralized management interface a selection of a service request from a user for at least one of the one or more discovered devices; identifying a service based on the service request; identifying a device based on the service request; populating a form with information related to the identified device and the identified service; determining a candidate service entity for performing the identified service on the identified device; and scheduling the identified service with the candidate service entity, the one or more notifications including a schedule notification that is associated with the scheduling.

In another aspect, an apparatus can include circuitry configured to send or receive data via one or more portions of a local network associated with a user; and a processor configured to map the local network to create a network map of one or more discovered devices that are communicatively coupled with the local network, determine device information about the one or more discovered devices, the device information comprising one or more device identifications corresponding to the one or more discovered devices, store the network map and the device information in a profile associated with the user, and provide a centralized management interface for managing the one or more discovered devices, the interface being configured to present information comprising the network map, the device information, and one or more notifications, the one or more notifications being based on an analysis of the device information and the network map. The processor can be configured to execute a management application that is configured to map the local network by at least scanning for devices using one or more wireless communication protocols via one or more wireless network interfaces and render the centralized management interface.

In another aspect, a system can include a network interface configured to communicate with devices; and a processor configured to store applications, including a management application, for download to the devices via the network interface. The management application can include instructions to cause a device to perform operations including mapping a local network associated with a user to create a network map of one or more discovered devices that are communicatively coupled with the local network; determining device information about the one or more discovered devices, the device information comprising one or more device identifications corresponding to the one or more discovered devices; storing the network map and the device information in a profile associated with the user; and providing a centralized management interface for managing the one or more discovered devices, the interface being configured to present information comprising the network map, the device information, and one or more notifications, the one or more notifications being based on an analysis of the device information and the network map.

This and other implementations may include one or more of the following features. The operations can include determining a device identifier for a discovered device of the one or more discovered devices, where determining device information can include retrieving device data from a server based on the device identifier, and where the device data can include information that is selected from a group including product catalog device data, device warranty data, device backup data, and device pricing information. Implementations can include a management server configured to analyze the local network, store data about the local network, and provide the one or more notifications to the management application. The management application can be configured to map the local network by at least scanning for devices using one or more wireless communication protocols via one or more wireless network interfaces and render the centralized management interface. Mapping the local network can include exchanging data about the local network with the management server. Determining the device information can include operating a device in a monitoring mode to gather network traffic from the local network; and extracting data from the network traffic. The device information can include one or more device types that are determined based on the extracted data. Providing the centralized management interface can include providing an interface to display warranty information about the one or more discovered devices. Providing the centralized management interface can include providing an interface to display resale pricing information about the one or more discovered devices. Providing the centralized management interface can include providing an interface to facilitate access to a service resource for repairing or providing advice related to at least one of the one or more discovered devices. Providing the centralized management interface can include providing an interface to secure digital information across multiple different devices, platforms, or cloud services associated with the local network. The operations can include receiving via the centralized management interface a selection of a service request from a user for at least one of the one or more discovered devices; identifying a service based on the service request; identifying a device based on the service request; populating a form with information related to the identified device and the identified service; determining a candidate service entity for performing the identified service on the identified device; and scheduling the identified service with the candidate service entity, wherein the one or more notifications can include a schedule notification that is associated with the scheduling. In some implementations, the local network can include one or more wireless local area networks and one or more Bluetooth wireless networks.

Particular configurations of the technology described in this document can be implemented so as to realize none, one, or more of the following potential advantages. Systems and methods described below can be used to automate the discovery of devices on a local network such as a home network. Systems and methods described below can be used to manage discovered devices via a centralized interface. The centralized interface can serve as a centralized resource for tracking information such as product receipts, warranty information, or resale values; making device service requests; or chatting with an advisor on a technical support hotline. The systems and methods described may not require dedicated hardware to be connected to the local network in order to map the local network.

Details of one or more implementations of the subject matter described in this document are set forth in the accompanying drawings and the description below. Other features, aspects, and potential advantages of the subject matter will become apparent from the description, the drawings, and the claims.

BRIEF DESCRIPTION OF THE DRAWINGS

FIG. 7 shows an example of a user profile that includes a network map and associated device information.

Like reference symbols in the various drawings indicate like elements.

DETAILED DESCRIPTION

Figure 1:
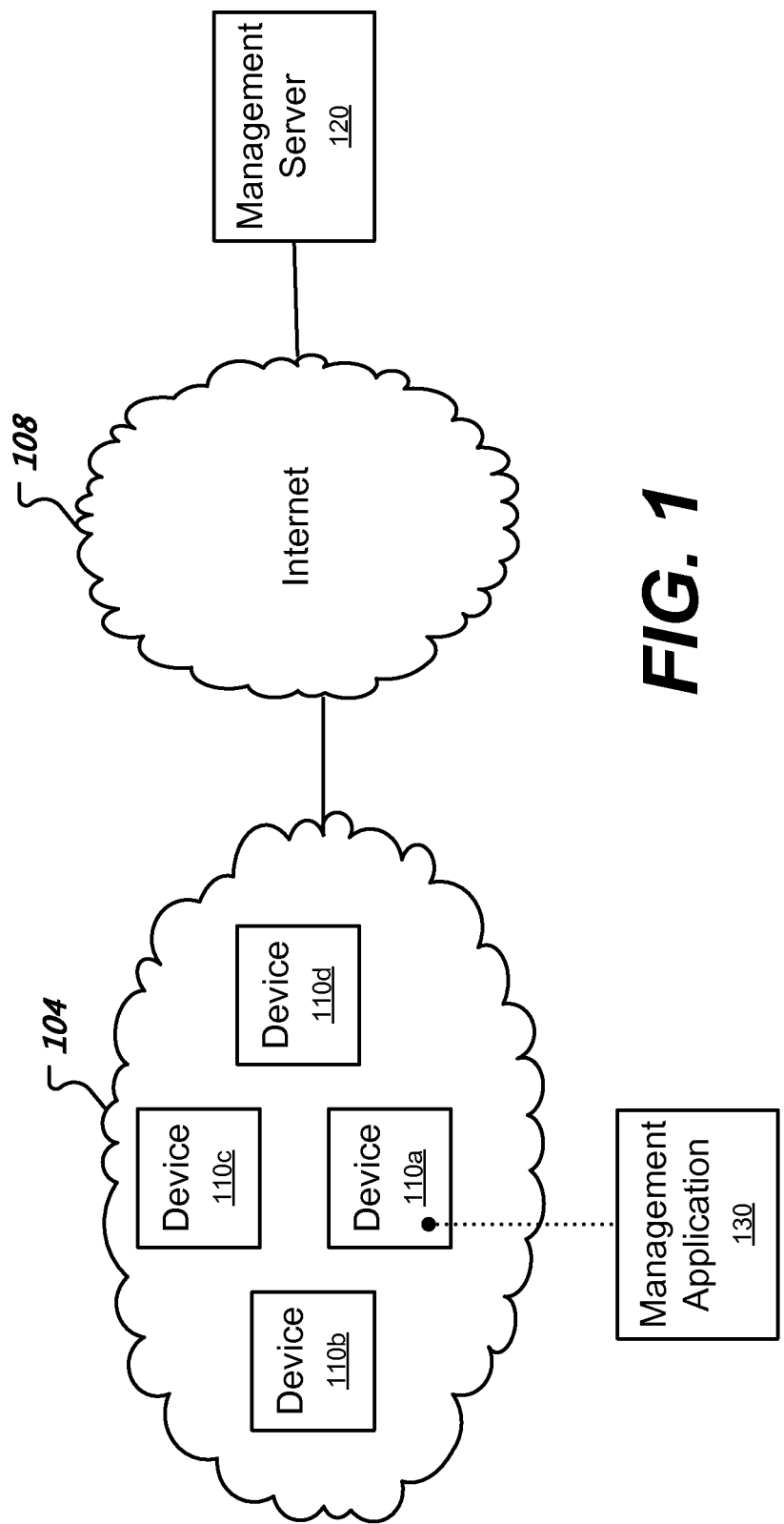
FIG. 1 shows an example of a network management architecture.

FIG. 1 shows an example of a network management architecture. Devices 110a-d can be communicatively coupled with a local network 104. The local network 104 can be coupled with another network, such as the Internet 108. In some implementations, the local network 104 can include one or more portions such as one or more wireless local area networks (WLAN), one or more Bluetooth networks, or a combination thereof. Further, a management server 120 can be coupled with the Internet 108. The management server 120 can be configured to provide backend device management functionality. A server such as the management server 120 or an application server can be configured to provide a management application 130 for download to one or more of the devices 110a-d.

A device 110a can be configured to execute the management application 130. The management application 130 can map the local network 104 to discover one or more of the devices 110a-d. In some implementations, the management application 130 can map devices that communicate via IEEE 802.11 and/or Bluetooth. Further, the management application 130 can create a network map and store it, for example, at the management server 120. A network map can include a list of device identifiers that correspond to devices discovered on the local network 104. In some implementations, the management application 130 can employ one or more service discovery routines to rapidly find and use devices and/or services provided within the local network 104. The management application 130 can use one or more protocols to gather information about devices communicatively coupled with the local network 104. Various examples of protocols for device and/or service discovery include UPnP, DLNA, Bonjour, HNAP, WS-Discovery, ARP, and DNS based protocols such as DNS-SD or mDNS. Other types of protocols are possible.

Figure 2:
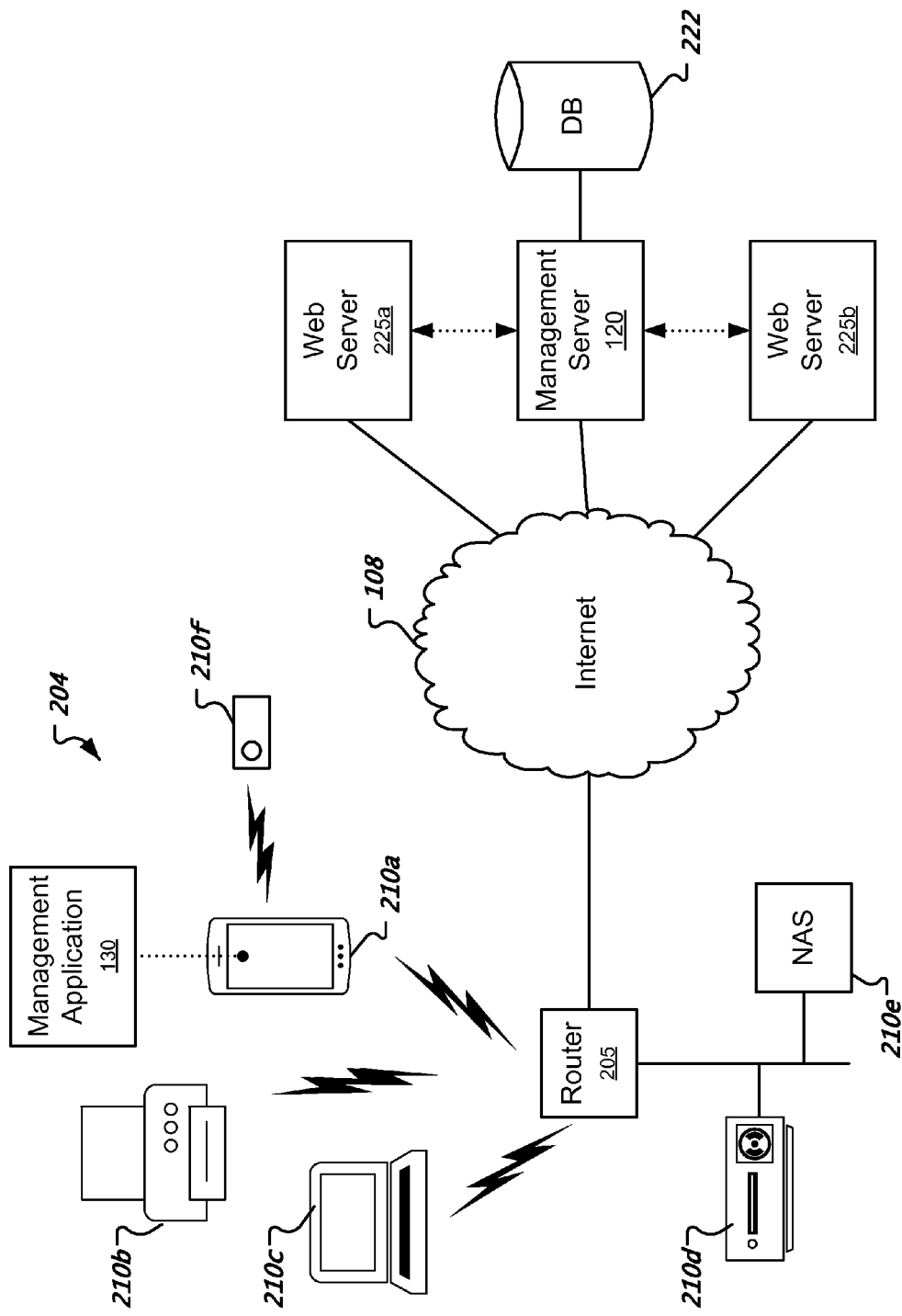
FIG. 2 shows another example of a network management architecture.

FIG. 2 shows another example of a network management architecture. Devices 210*a-f* can be communicatively coupled with a local network 204. A router 205 can provide the local network 204 connectivity with the Internet 108. For example, the router 205 can provide one or more wireless communication interfaces via a wireless standard such as an IEEE 802.11 standard. Devices such as a smartphone 210*a*, wireless printer 210*b*, and laptop 210*c* can wirelessly communicate with the router 205. The local network 204 can include Bluetooth devices such as a Bluetooth headset 210*f*, Bluetooth equipped automobile, or a Bluetooth multi-function device. The router 205 can provide one or more wireline communication interfaces such as Ethernet or Universal Serial Bus (USB). Devices such as a media server 210*d* and a network attached storage (NAS) device 210*e* can be connected to the router 205, for example, via one or more Ethernet cables.

In the example of FIG. 2, the management application 130 can communicate with one or more web servers 225*a-b*, which can communicate with one or more servers such as the management server 120. For example, the management application 130 can provide information such as network mapping information or network traffic information to the management server 120 via a web server 225*a-b*. The management server 120 can analyze the information provided by the management application 130, and provide data for a management interface, such as device details associated with discovered devices or notifications about the devices, to the management application 130.

One or more of the devices 210*a-e* can be configured to execute the management application 130 to map the local network 204 and discover one or more of the devices 210*a-f*. As part of the execution, the management application 130 can create a network map of the local network 204 using one or more network interfaces such as an IEEE 802.11 wireless interface and a Bluetooth wireless interface. The management server 120 can use a database 222 to store information such as one or more network maps in one or more respective user profiles. In some implementations, a user of a device 210*a*, for example, can enter login credentials such as a username and passcode into the device 210*a* via the management application 130. The device 210*a* can provide the login credentials to a web server 225*a* to access a user account. The device 210*a* can send information such as a network map to the management server 120 via the web server 225*a*. The management server 120 can then store the network map in a user profile associated with the user account in the database 222.

In some implementations, the web servers 225*a-b* are hosting a frontend server application that communicates with the management application 130. Further, a load balancing mechanism can distribute requests from the management application 130, in addition to requests from other management applications running on other local networks to the web servers 225*a-b*. In some implementations, the traffic generated by the management application 130 is stateless with respect to the web servers 225*a-b* and, therefore, requires no session at the web servers 225*a-b*. Thus, the load balancing mechanism can dynamically change, among different packets, the destination of the traffic, e.g., it can switch among the web servers 225*a-b*. In some implementations, the management server 120 creates a session for a user account, which can be accessed via, for example, any of the web servers 225*a-b*.

The management server 120 can execute one or more background processes to perform one or more database operations on database 222, analyze network data associated with a network map received from the management application 130, and/or provide notifications based on the analysis. Notifications can include usage tips or alerts such as environmental alerts (e.g., processor temperature has exceeded a threshold temperature), the printer is out-of-ink, the anti-virus software is out-of-date, a warranty expiration notice (e.g., 1 week left before device warranty expires), a periodic report, or a device has not been backed up. In some implementations, the notifications can be posted to a user account. In some implementations, the notifications can be pushed to the management application 130, which can be configured to present the notifications to a user of a device via a management interface. In some implementations, notifications can include requests to perform actions such as clear disk space or a laptop battery needs to be replaced.

In some implementations, the management application 130 can map the local network 204 by sending probe packets. In some implementations, the management application 130 can send a broadcast or multicast probe packet and confine the packet to the local network 204 by, for example, setting a time to live (TTL) field in a packet header to predetermined value (e.g., one), thereby causing the probe packet not to be routed outside of the local network 204. In some implementations, the management application 130 can confine probing by using a broadcast address that is specific to the local network 204. For example, when router 205 is using network address translation (NAT), where it assigns network addresses from a private address range to devices on the local network 204, then the management application 130 can use a broadcast address corresponding to the private address range as a destination address of a probe packet.

Figure 3:
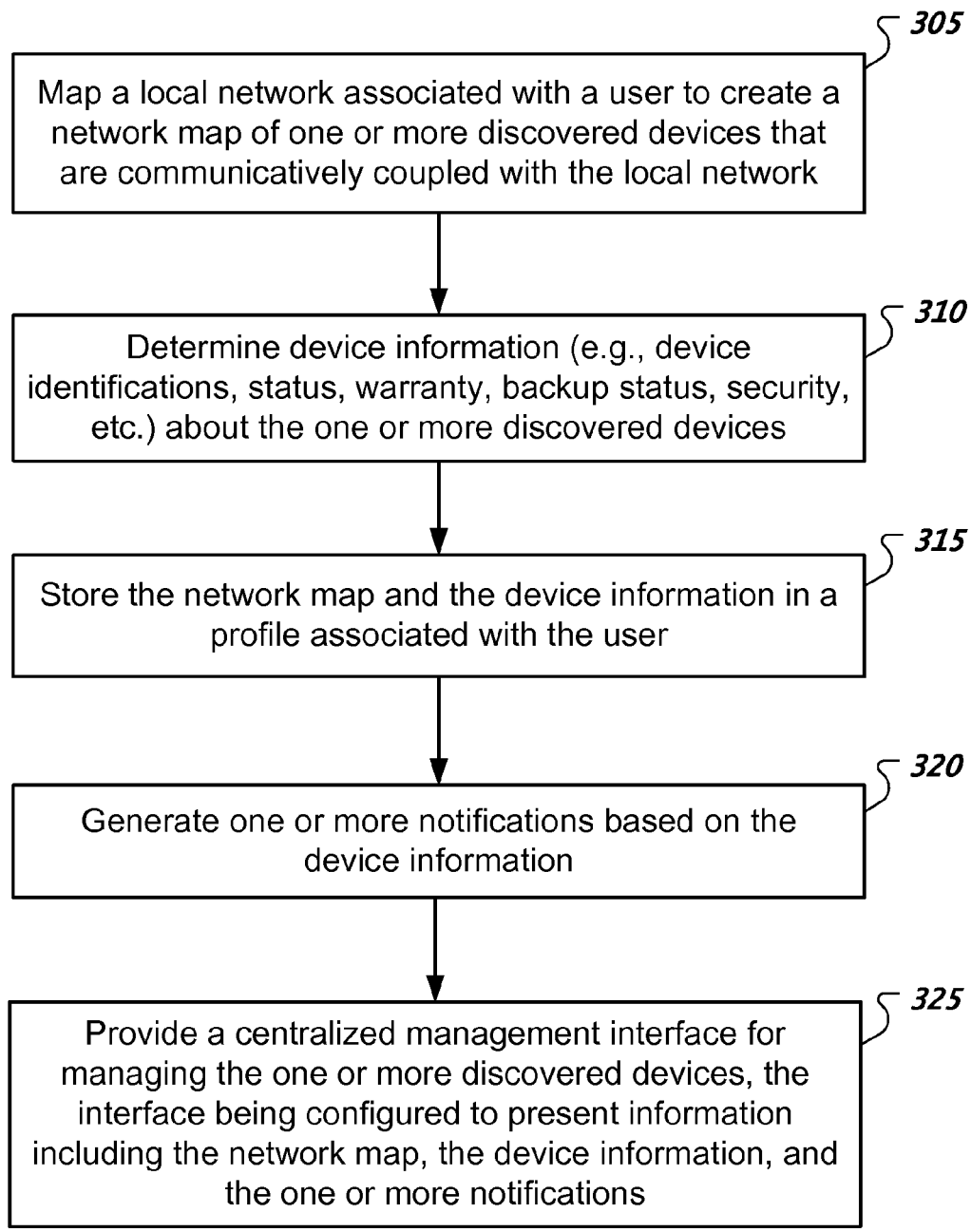
FIG. 3 shows a flowchart for an example of a network management process.

FIG. 3 shows a flowchart for an example of a network management process. The management process can be implemented by a device or system such as one or more management servers, one or more wireless or wireline communication devices, or a combination thereof. Various examples of a wireless communication device include a smartphone, wireless tablet, or wireless laptop. At 305, a local network associated with a user is mapped to create a network map of one or more discovered devices that are communicatively coupled with the local network. In some implementations, mapping a local network can include initiating or causing a device on the local network to scan the local network for devices, and send scan results to, for example, a server. Initiating or causing can for example be in associating with the download of an application to a specific user device that includes code, once executed, that scans and maps a local network associated with the client device. For example, mapping the local network can include receiving device identifiers about one or more discovered devices from a management application that has been downloaded to and is executing on a client device. In some implementations, a user device associated with the local network can download the management application, initiate execution of the management application, and map the local network using the management application. Mapping a local network can include scanning multiple wireless communication protocols such as the Bluetooth protocol and an IEEE 802.11 protocol via one or more wireless network interfaces to produce the network map. For example, a network map can include an identifier for a Bluetooth enabled device such as a Bluetooth headset and an identifier for a device that communicates via an IEEE 802.11 protocol. In some implementations, mapping a local network can include identifying two or more different devices of two or more different types associated with two or more different operating systems or platforms. In some implementations, discovering a device can include monitoring for a service published on a local network by a device using one or more service discovery protocols. In some implementations, discovering a device can include extracting a source network address of a packet originating on the local network.

At 310, device information is determined about the one or more discovered devices (i.e., based on the mapping). Determining device information can include gathering information such as device identifications or device status from one or more sources. Device identification can include a device identifier, device type, device name, etc. Device status can include a network connection status, operational status, backup status, security status, etc. Moreover, device information can include information such as product catalog data, warranty data, device back up data, device resale pricing information, or manufacture information. Other types of device information are possible.

Determining device information at 310, can include directly querying a device on the local network via a network protocol. Determining device information can include communicating with a server to retrieve information about a device on the local network. Determining device information can include monitoring network traffic on the local network to determine one or more device details such as device type and device status. In some implementations, determining device information can include monitoring for one or more services via a service discovery protocol such as an mDNS protocol. In some implementations, a device type can be inferred from a service provided by a device. For example, if a device is publishing a printing service, then it can be inferred that the device is a printer. In another example, if a device is publishing a media service, then it can be inferred that the device is a media device. In some implementations, a user can be prompted to provide information about a discovered device. For example, a user can be prompted to enter a nickname for a discovered device. Use of nicknames as opposed to addresses or the like can facilitate better understanding and ease of use of any notification information provided, such notifications being discussed in further detail below.

At 315, the network map and the device information is stored in a profile associated with the user. In some implementations, storing the network map and the device information can include writing data to a local storage area. A network map can be represented by a data structure, e.g., a list, queue, or array, that includes one or more device identifiers such as a device name, network address, or media access control (MAC) address. In some implementations, storing the network map and the device information can include sending data to a management server that is configured to write, process and otherwise store the data to a database.

At 320, one or more notifications are generated based on the device information. In some implementations, generating can include analyzing the device information and generating a customized notification to a user based on the analyzing and one or more user-configurable or operator-configurable notification settings. In some implementations, the notifications can be generated based on the device information, analysis of the device information, device usage information, the network map, or a combination thereof. Analysis of the device information can include an analysis of packets sent to a device or sent by the device. For example, backup activity can be inferred from packets being sent from a device to a backup service provider. If backup activity has not been detected within a predetermined time period, then a backup-warning notification can be generated.

At 325, a centralized management interface is provided for managing the one or more discovered devices. The centralized management interface can be configured to present information including the network map, the device information, and the one or more notifications. In some implementations, providing a centralized management interface can include sending data for display to a user and via an application such as a web browser or a management application. In some implementations, mapping the local network includes mapping devices in the local network to specific users, and the centralized management interface can provide details broken down by specific users. For example, the centralized management interface can render a network map that is sorted by users and their respective one or more devices. In some implementations, the process can include identifying a device associated with the local network based on a network map, evaluating the device information associated with the device, and presenting device information based on the evaluating in the centralized management interface.

One or more portions of the network management process of FIG. 3 can be repeated to update a current configuration of the devices coupled with the local network at a given time while maintaining a list of coupled devices including devices previously coupled with the local network. In some implementations, one or more portions of the network management process of FIG. 3 can be repeated at predetermined intervals, when a device connects or reconnects to the local network, on-demand, or a combination thereof.

Figure 4:
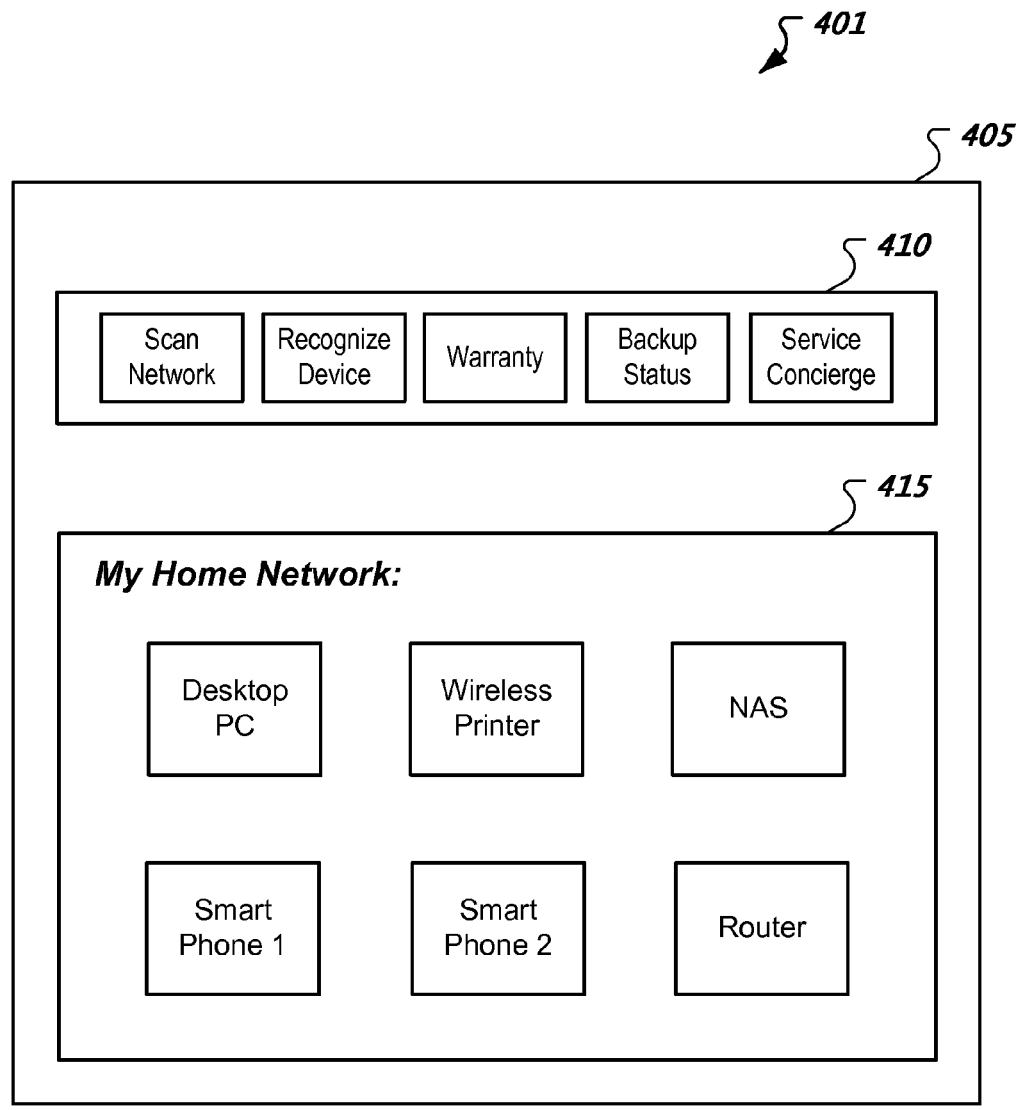
FIG. 4 shows an example of a layout of a centralized management interface.

FIG. 4 shows an example of a layout of a centralized management interface 401. The centralized management interface 401 can include an interface window 405 configured to display a group of controls 410 and a group of device icons 415. In this example, the group of controls 410 includes virtual buttons for scan network, recognize device, warranty, backup status, and service concierge. The scan network button can initiate a network scan procedure, which can include mapping the local network, e.g., home network, and gathering information about one or more connected devices. The warranty button can be used to provide information about a device warranty and/or purchase an extended warranty. The backup status button can be used to show backup status for applicable devices, such as those associated with the local network. The service concierge button can be used to request service for a device. A recognize device button can initiate a visual scan of a target device to identify the device and add it to the local network. For example, the visual scan can include using optical character recognition (OCR) to identify a device by its model number. In some implementations, the recognize device button can activate a camera (e.g., mobile device camera) that can take a picture of the device's model number on the device itself, and once taken, performs OCR to convert the image to text and extract the model number. The model number can be used to create a device entry in the mapping.

The group of device icons 415 can correspond to devices that have been discovered. The group of device icons 415, in this example, includes icons for a desktop computer, wireless printer, NAS, smartphones, and router. In some implementations, the group of device icons 415 is initially empty, but becomes populated with one or more device icons based on a network scan. While icons are described, other designators are possible.

The centralized management interface 401 can, in some implementations, enable security and backup management of digital assets and services such as securing and/or backing up digital information across multiple different devices, platforms, or cloud services associated with the local network or devices coupled thereto. In some implementations, the centralized management interface 401 can provide backup information, such as a backup status and associated timestamp for a last backup, about a device on the local network. For example, a management application can use information including the network map to identify a device associated with the local network, evaluate the device information to determine a backup destination for the identified device and a last time that backup occurred, and present backup information for the identified device in the centralized management interface 401. In some implementations, a notification can be generated if the identified device has not been backed up within a predetermined amount of time. In some implementations, a notification can be generated if the last backup has failed. In some implementations, the centralized management interface 401 can provide direct access to technical advisors to help with a user's issue. The centralized management interface 401, for example, can include a chat-based application that connects to a technical advisor.

In some implementations, the management application can obtain warranty information for a device on the local network from one or more sources such as a management server, warranty provider, user input, receipt, or a combination of sources. In some implementations, a management application can use information including the network map to identify a device associated with the local network, evaluate the device information to determine a warranty that is associated with the identified device, and present warranty information via the centralized management interface 401 for the identified device. In some implementations, the centralized management interface 401 can provide manual entry options for adding non-connected devices to the local network, such options can include optical character recognition, barcode scanning, or text entry.

Figure 5:
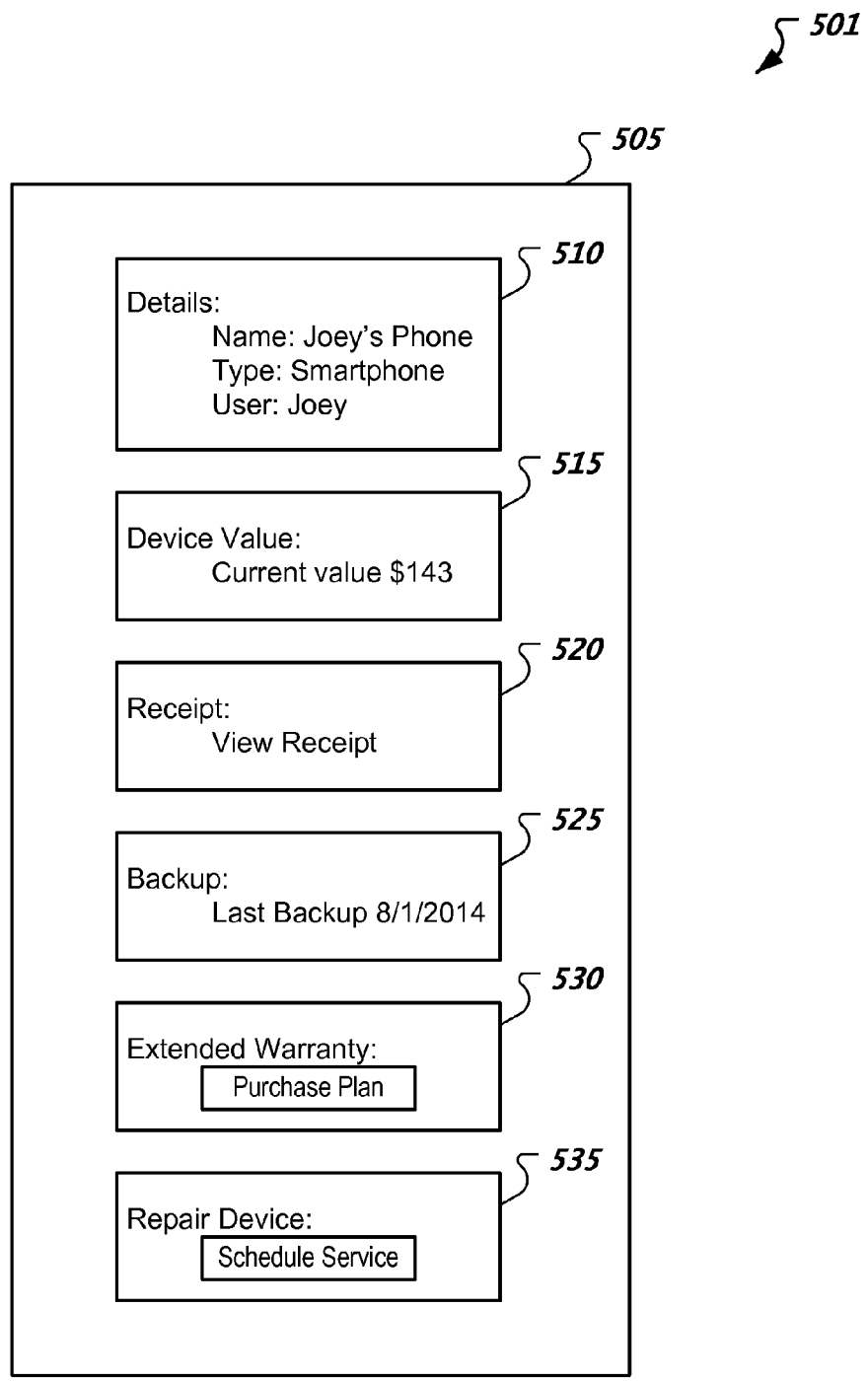
FIG. 5 shows an example of a layout of a device portion of a centralized management interface.

FIG. 5 shows an example of a layout of a device portion of a centralized management interface 501. The centralized management interface 501 can include an interface window 505 that is configured to display a group of modules 510, 515, 520, 525, 530, 535 for a device portion of the centralized management interface 501. The details module 510 can include details about a device such as a device name, device type, and assigned user. The receipt module 520 can be used to upload a copy of a device receipt and then view it when needed. In some implementations, a management application can be configured to receive via the receipt module 520 a receipt associated with a purchase of a device and store the received receipt for use in processing a warranty claim. The backup module 525 can provide backup status information. The extended warranty module 530 can be used to purchase an extended warranty, or if already purchased, provide a link to extended warranty details. The repair device module 535 can be used to schedule a repair service. In some implementations, the centralized management interface 501 includes a service interface such as the repair device module 535 to facilitate access to a resource for repairing or providing advice related to a device. The centralized management interface 501 can be configured to receive a selection of a service request from a user. The centralized management interface 501 can be configured to identify a device for service, populate a request form with information related to the identified device, determine a candidate service entity for performing the service on the device, schedule the service, and notify the user of the scheduled service.

The centralized management interface 501 can provide pricing information about a device via a device value module 515. In this example, the device value module 515 can indicate the current value of the device identified by the details module 510 (e.g., the wholesale, retail, trade in or other value of the device). In some implementations, a management application can use information including the network map to identify a device associated with the local network, evaluate device information to determine a value associated with the device, where the value represents a re-sale value of the device in a market, and present the value in the device value module 515.

In some implementations, the centralized management interface 501 can be configured to provide a device removal option such as a remove virtual button or menu item. A management application providing the centralized management interface 501, for example, can receive a removal instruction to remove a device from a network map, and remove the device from the network map in response to the removal instruction.

Device pricing information can be based on device information such as device manufacturer, model, memory size, color, and wireless carrier. Such device information can be gathered from a local network, from a user interface, or an on-device application programming interface (API). A management server can obtain the device information and send it to a device pricing service provider, which can return a value for the device. A management server can be configured to generate a price notification based on a change in device value. In some implementations, a management server can obtain the device information and determine whether the device is eligible for an upgrade to a newer device, and if so, can generate an upgrade notification.

Figure 6:
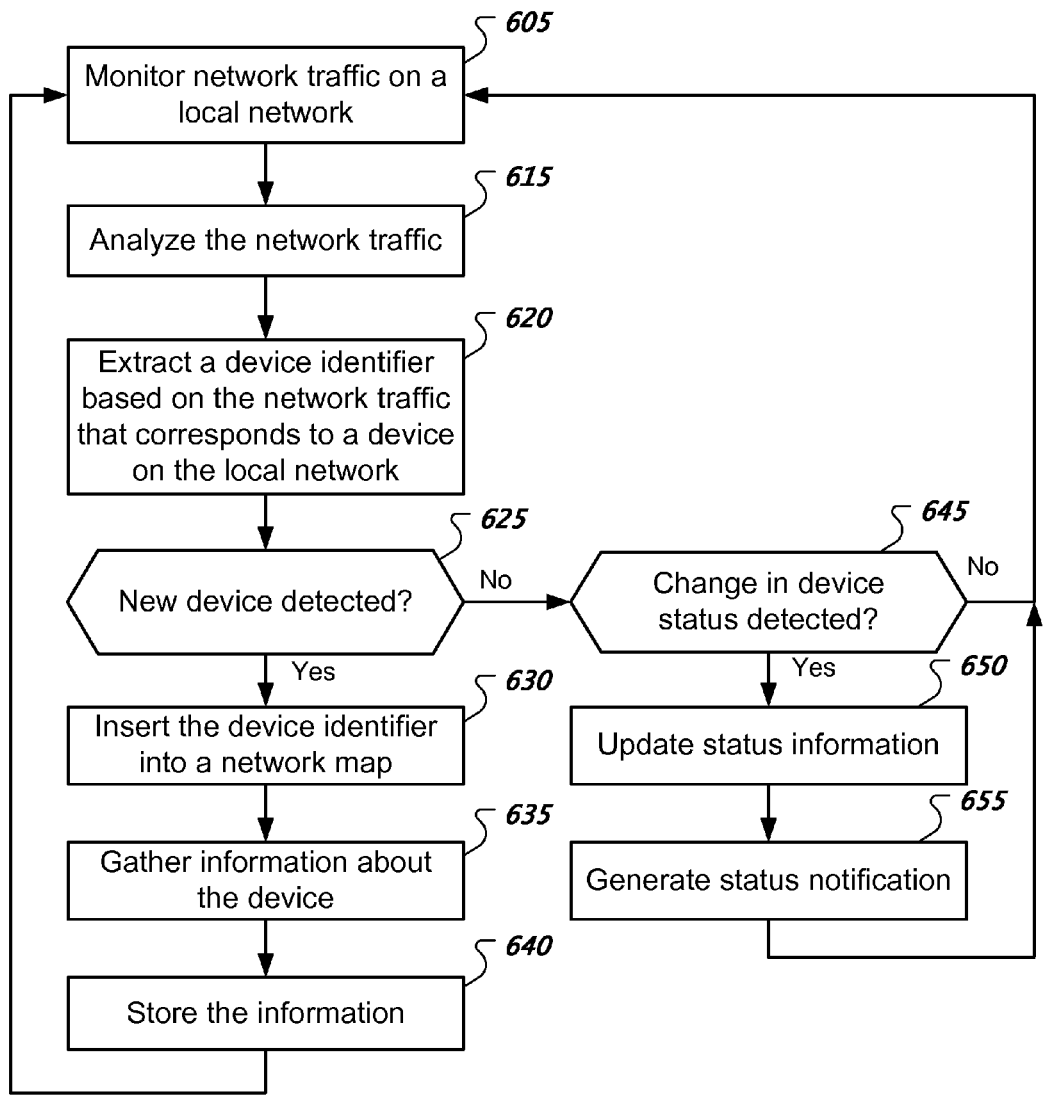
FIG. 6 shows a flowchart for an example of a network scanning and discovery process.

FIG. 6 shows a flowchart for an example of a network scanning and discovery process. At 605, network traffic is monitored on a local network. Monitoring network traffic can include scanning two or more wireless communication protocols such as the Bluetooth protocol and an IEEE 802.11 protocol. Other types of protocols are possible such as ZigBee and Z-Wave. Monitoring network traffic can include listening for packets associated with one or more protocols for device and/or service discovery such as UPnP, DLNA, Bonjour, HNAP, WS-Discovery, ARP, and DNS based protocols such as DNS-SD or mDNS. In some implementations, monitoring network traffic can include gathering Network Basic Input/Output System (NetBIOS) information, performing hostname lookups, and performing port scans. Port scanning can be used to discover devices and services running on the devices. In some implementations, the process can cause a wireless or wireline interface to operate in a monitor mode, such as promiscuous mode, to monitor traffic on a local network. In some implementations, the process can cause a wireless interface to operate in a wireless monitor mode to monitor traffic on a wireless local network.

At 615, the network traffic is analyzed. Analyzing the network traffic can include finding correlations among network traffic packets to yield details of a given device on the local network. In some implementations, a correlation can be made by inspecting the network traffic and using other data points associated with a device. A device's IP address and/or MAC address can serve as an identifier between traffic samples and previously identified devices. Various examples of data points gathered for correlation include user-agent strings, proprietary protocol detection, application detection (some only run on specific platforms), and TCP fingerprinting techniques such as sequence and timestamp. The data points can be used, for example, to correlate a device to an OS type (Windows or Linux), device type (e.g., router, media hub, laptop, etc.), or both. In some implementations, the data points can be stored on a server for finding additional correlations in the future.

At 620, a device identifier is extracted based on the network traffic that corresponds to a device on the local network. Various examples of a device identifier include a MAC address, network address, universally unique identifier (UUID), or a device name string. Other types of device identifiers are possible. In some implementations, the process can extract a MAC address from a source MAC address field in a packet.

At 625, a determination is made whether a new device has been detected. If a new device has been detected, then at 630, the device identifier associated with the new device is inserted into a network map. Determining whether a new device has been detected can include comparing the extracted device identifier with zero or more extracted device identifiers previously stored in a then current network map.

At 635, information about the device is gathered. Gathering information about the device can include determining a device type, specific operating system running on the device, warranty information, service plan information, backup information, etc. In some implementations, information collected from a port scanning procedure, such as a group of open ports on a device, can be used to determine an operating system that is running on the device. In some implementations, gathering information can include using the device identifier to retrieve device information from a service provider database. For example, device specific information such as a device model string or serial number can be sent to a device reseller service to obtain a current resale value for a device. In another example, device specific information can be sent to a warranty service provider to obtain warranty information for a device, such as its warranty policy, expiration of warranty, or if an extended warranty is available for purchase. At 640, the process stores the information. The process continues to monitor again for network traffic at 605.

If a new device was not detected at 625, then at 645, a determination is made to whether there is a change in device status. Determining whether there has been a change in device status can include extracting data from packets going to or coming from a device. In some implementations, the process can connect to a device's web page such as a printer's device management web page and parse the page data with a tool such as XPath. In some implementations, a management application can be running on a device which causes the device to scrape packets from a network interface. For example, a scraped packet can indicate that the sender is a printer, and the management application can send a web page request to the printer. The printer's web page can provide one or more printer ink levels, ink status, or both. If an ink-level is now below a threshold or an ink status is different from a previously extracted status from the printer's web page, then a device status change can be inferred.

If there has been no changes in device status, then the process continues to monitor again for network traffic at 605. If a change in device status has been detected, then at 650, status information is updated, and at 655, a status notification can be generated. The process continues to monitor again for network traffic at 605. In some implementations, determining whether there is a change in device status can include using data extracted from a network scan. For example, a wireless printer may send a packet that includes a low-ink warning message to another device on the network. The low-ink warning message can be extracted and the status information for the wireless printer can be updated. Further, the process can be configured to generate a status notification at 655 in response to the extracted low-ink warning message. In some implementations, the process can be configured to automatically take action based on the status notification, e.g., automatically order a replacement ink-cartridge based on the low-ink warning. In some implementations, device status can include whether a device is on and currently connected with the network.

In some implementations, a device can be configured to periodically run the process of FIG. 6 at predetermined intervals. In some implementations, a device can be configured to run the process when the device connects or reconnects to the local network. In some implementations, a device can be configured to run the process on-demand in response to a user selection of a network scan refresh option within a centralized management interface.

FIG. 7 shows an example of a user profile 700 that includes a network map and associated device information. The user profile 700 can include information about a network map and device information. In this example, the user profile 700 includes records 705a-n for respective devices that are communicatively coupled with a home network. The user profile 700 can include one or more records 705a, 705n for devices that are currently connected, e.g., via wireless or wireline, with the home network. The user profile 700 can maintain records for devices that are not currently connected. For example, the user profile 700 can include one or more records 705b for one or more devices that were previously connected with the home network. Records 705a-n can be sorted by a device identifier 702 such as a MAC address, a UUID, or a serial number. In addition to the device identifier 702, the records 705a-n can store information under one or more fields such as a device name 704, device type 706, status 708, parental control 712, warranty information 714, and service information 716. More, less, or different fields can be used within a user profile 700.

In some implementations, a device name 704 can be supplied by a user via a centralized management interface. For example, a user can manually type in an alphanumerical string in a device name field in a centralized management interface. In some implementations, information such as a device identifier 702, device type 706, or status 708, can be extracted from network traffic associated with the local network. In some implementations, information such as device name 704, warranty information 714, or service information 716 can be obtained from a service provider server based on an identifier such as a device identifier or a serial number.

In some implementations, parental controls 712 can be used to allow parents to control some functionality of a child's device. A parental application can be installed on the child's device to register the device with a management server. The parent can use the management server's web interface to configure lock, unlock, and set lock times options for the device. For example, the child's phone will lock every night at 9 PM (bedtime). In some implementations, the parental application can provide a lock screen widget that allows the child's phone to be used for emergency calls to a number (s) set in the web interface by the parent.

Figure 8:
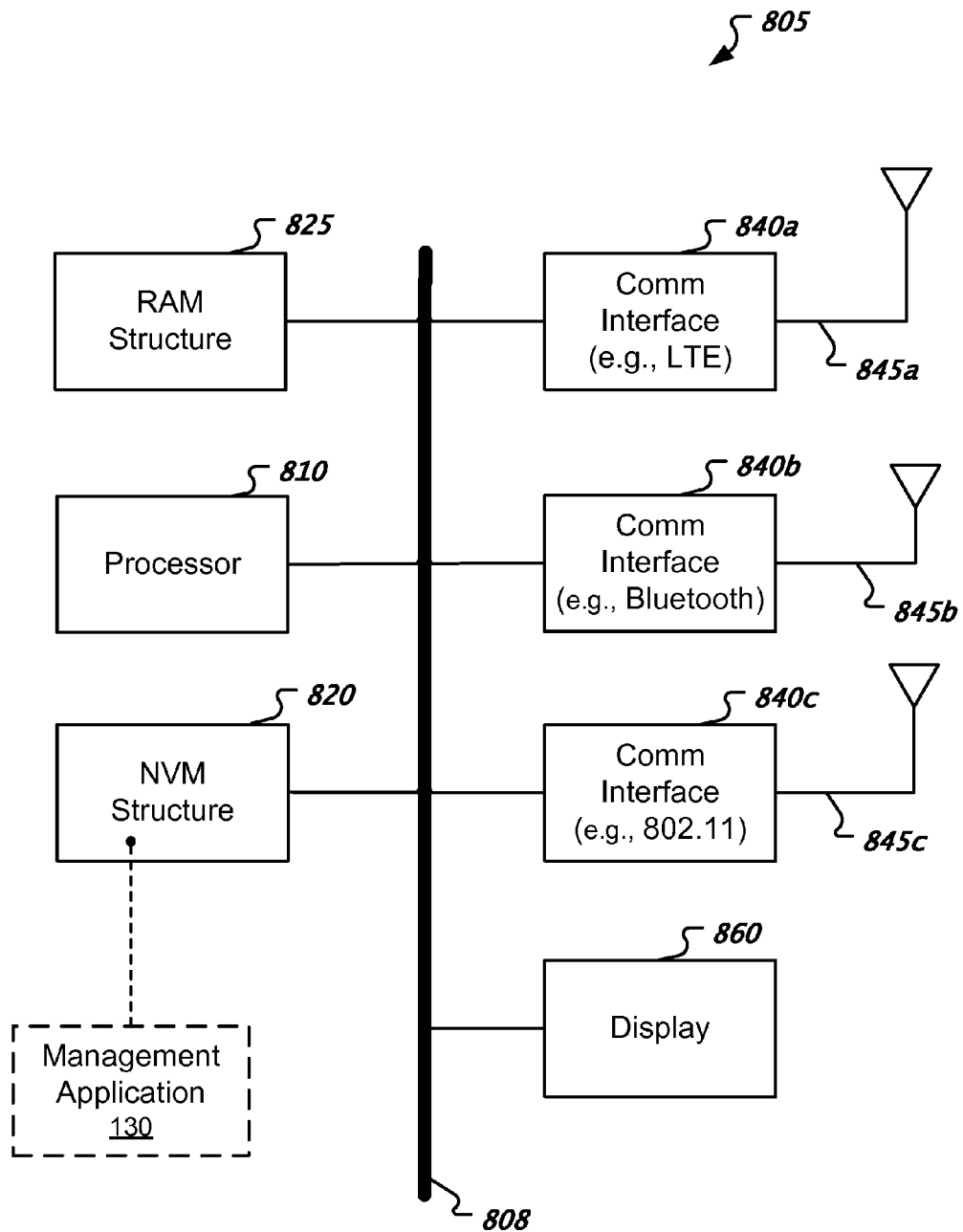
FIG. 8 shows a simplified architecture of an example of a wireless communication device that is configured to run a management application.

FIG. 8 shows a simplified architecture of an example of a wireless communication device 805 that is configured to run a management application. The wireless communication device 805 includes a processor 810, non-volatile memory (NVM) structure 820, random-access memory (RAM) structure 825, display 860, communication interfaces 840a-c, and antennas 845a-c. In some implementations, communication interfaces 840a-c can be referred to as network interfaces. Communication interfaces 840a-c can include a transceiver to send and receive signals via one or more antennas 845a-c. The device 805 can include other components not shown such as a touch interface, keyboard, camera, and motion sensors. A bus 808 can interconnect components within the wireless communication device 805.

The wireless communication device 805 can send and receive data packets over one or more wireless interfaces. For example, the processor 810 can send and receive data packets via one or more communication interfaces 840a-c and antennas 845a-c. Various examples of wireless interface technology include interfaces based on Long Term Evolution (LTE), Global System for Mobile Communications (GSM), IEEE 802.11a/b/g/n/ac, and Code Division Multiple Access (CDMA) technologies such as CDMA2000 and WCDMA. Other types of wireless interface technologies are possible. The wireless communication device 805 can download application software over one or more of these wireless interfaces and store the application software on a memory structure such as the NVM structure 820 or the RAM structure 825.

The NVM structure 820 stores software such as a wireless device OS and application software such as the management application 130. The processor 810 can load software from the NVM structure 820 into the RAM structure 825, and can start to execute the software from the RAM structure 825. In some implementations, the processor 810 directly executes software from the NVM structure 820. In some implementations, the processor 810 includes multiple processor cores. In some implementations, the management application 130 can scan a local network by scanning for devices via a communication interface 840b configured for Bluetooth-based communications and scan the local network by scanning for devices via a communication interface 840c configured for 802.11-based communications. In some implementations, the management application 130 can configured the communication interface 840c to operate in a monitor mode to gather traffic that is receivable via the interface 840c. In some implementations, the management application 130 can configured the communication interface 840c to operate in a multicast mode to receive multicast packets associated with a service discovery protocol.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for detecting impersonation on a social network may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A method comprising:
    mapping a local network associated with a user account to create a network map of one or more discovered devices that are communicatively coupled with the local network;
    determining one or more device identifiers for the one or more discovered devices;
    determining device information about the one or more discovered devices, wherein determining the device information comprises retrieving device data from a management server based on the one or more device identifiers and the user account, the management server being configured to store information for a plurality of user accounts and respective network maps;
    storing the network map and the device information in a profile associated with the user account; and
    providing a centralized management interface for managing the one or more discovered devices, the interface being configured to present information comprising the network map, the device information, and one or more notifications, the one or more notifications being based on an analysis of the device information and the network map.

2. The method of claim 1, wherein the device data comprise information that is selected from a group comprising product catalog device data, device warranty data, device backup data, and device pricing information.

3. The method of claim 1, comprising:
providing to a device associated with the local network, a management application, the management application being configured to (i) map the local network by at least scanning for devices using one or more wireless communication protocols via one or more wireless network interfaces and (ii) render the centralized management interface,
wherein mapping the local network comprises receiving data about the local network from the management application, and
wherein providing the centralized management interface comprises sending the device information to the management application, and sending the one or more notifications to the management application.

4. The method of claim 1, wherein determining device information comprises:
operating a device in a monitoring mode to gather network traffic from the local network; and
extracting data from the network traffic,
wherein the device information comprises one or more device types that are determined based on the extracted data.

5. The method of claim 1, wherein providing the centralized management interface comprises one or more of the following:
providing an interface to display warranty information about the one or more discovered devices,
providing an interface to display resale pricing information about the one or more discovered devices,
providing an interface to facilitate access to a service resource for repairing or providing advice related to at least one of the one or more discovered devices, or
providing an interface to secure digital information across multiple different devices, platforms, or cloud services associated with the local network.

6. The method of claim 1, comprising:
receiving via the centralized management interface a selection of a service request from a user for at least one of the one or more discovered devices;
identifying a service based on the service request;
identifying a device based on the service request;
populating a form with information related to the identified device and the identified service;
determining a candidate service entity for performing the identified service on the identified device; and
scheduling the identified service with the candidate service entity, wherein the one or more notifications comprise a schedule notification that is associated with the scheduling.

7. An apparatus comprising:
circuitry configured to send or receive data via one or more portions of a local network associated with a user account; and
a processor configured to (i) map the local network to create a network map of one or more discovered devices that are communicatively coupled with the local network, (ii) determine device information about the one or more discovered devices, (iii) store the network map and the device information in a profile associated with the user account, and (iv) provide a centralized management interface for managing the one or more discovered devices, the interface being configured to present information comprising the network map, the device information, and one or more notifications, the one or more notifications being based on an analysis of the device information and the network map, wherein the processor is configured to determine one or more device identifiers for the one or more discovered devices, and retrieve device data from a management server based on the one or more device identifiers and the user account, the management server being configured to store information for a plurality of user accounts and respective network maps.

8. The apparatus of claim 7, wherein the device data comprise information that is selected from a group comprising product catalog device data, device warranty data, device backup data, and device pricing information.

9. The apparatus of claim 7, wherein the processor is configured to execute a management application that is configured to (i) map the local network by at least scanning for devices using one or more wireless communication protocols via one or more wireless network interfaces and (ii) render the centralized management interface.

10. The apparatus of claim 7, wherein the processor is configured to operate the apparatus in a monitoring mode to gather network traffic from the local network, and extract data from the network traffic to determine one or more device types, and wherein the device information comprises the one or more device types.

11. The apparatus of claim 7, wherein the processor is configured to perform one or more of the following operations:
providing an interface to display warranty information about the one or more discovered devices,
providing an interface to display resale pricing information about the one or more discovered devices,
providing an interface to facilitate access to a service resource for repairing or providing advice related to at least one of the one or more discovered devices, or
providing an interface to secure digital information across multiple different devices, platforms, or cloud services associated with the local network.

12. The apparatus of claim 7, wherein the processor is configured to perform operations comprising:
receiving via the centralized management interface a selection of a service request from a user for at least one of the one or more discovered devices;
identifying a service based on the service request;
identifying a device based on the service request;
populating a form with information related to the identified device and the identified service;
determining a candidate service entity for performing the identified service on the identified device; and
scheduling the identified service with the candidate service entity, wherein the one or more notifications comprise a schedule notification that is associated with the scheduling.

13. The apparatus of claim 7, wherein the local network comprises one or more wireless local area networks and one or more Bluetooth wireless networks.

14. A system comprising:
a network interface configured to communicate with devices; and
a processor configured to store applications, including a management application, for download to the devices via the network interface,
wherein the management application comprises instructions to cause a device to perform operations comprising:

mapping a local network associated with a user account to create a network map of one or more discovered devices that are communicatively coupled with the local network;
determining one or more device identifiers for the one or more discovered devices;
determining device information about the one or more discovered devices, wherein determining the device information comprises retrieving device data from a management server based on the one or more device identifiers and the user account, the management server being configured to store information for a plurality of user accounts and respective network maps;
storing the network map and the device information in a profile associated with the user account; and
providing a centralized management interface for managing the one or more discovered devices, the interface being configured to present information comprising the network map, the device information, and one or more notifications, the one or more notifications being based on an analysis of the device information and the network map.

15. The system of claim 14, wherein the device data comprise information that is selected from a group comprising product catalog device data, device warranty data, device backup data, and device pricing information.

16. The system of claim 14, comprising:
the management server, wherein the management server is configured to analyze the local network, store data about the local network, and provide the one or more notifications to the management application,
wherein the management application is configured to (i) map the local network by at least scanning for devices using one or more wireless communication protocols via one or more wireless network interfaces and (ii) render the centralized management interface, and
wherein mapping the local network comprises exchanging data about the local network with the management server.

17. The system of claim 14, wherein determining the device information comprises:
operating a device in a monitoring mode to gather network traffic from the local network; and
extracting data from the network traffic,
wherein the device information comprises one or more device types that are determined based on the extracted data.

18. The system of claim 14, wherein providing the centralized management interface comprises one or more of the following:
providing an interface to display warranty information about the one or more discovered devices,
providing an interface to display resale pricing information about the one or more discovered devices,
providing an interface to facilitate access to a service resource for repairing or providing advice related to at least one of the one or more discovered devices, or
providing an interface to secure digital information across multiple different devices, platforms, or cloud services associated with the local network.

19. The system of claim 14, the operations comprising:
receiving via the centralized management interface a selection of a service request from a user for at least one of the one or more discovered devices;
identifying a service based on the service request;
identifying a device based on the service request;
populating a form with information related to the identified device and the identified service;
determining a candidate service entity for performing the identified service on the identified device; and
scheduling the identified service with the candidate service entity, wherein the one or more notifications comprise a schedule notification that is associated with the scheduling.

20. The system of claim 14, wherein the local network comprises one or more wireless local area networks and one or more Bluetooth wireless networks.

* * * * *